(12) United States Patent
Ljung et al.

(10) Patent No.: US 10,880,348 B2
(45) Date of Patent: Dec. 29, 2020

(54) METHODS AND DEVICES FOR CONTROLLING STREAMING OVER A RADIO NETWORK

(71) Applicant: Sony Mobile Communications Inc., Tokyo (JP)

(72) Inventors: Rickard Ljung, Helsingborg (SE); Peter C. Karlsson, Lund (SE); Martin Danielsson, Lund (SE); Erik Bengtsson, Lund (SE); Zhinong Ying, Lund (SE)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 15/756,876

(22) PCT Filed: Sep. 18, 2015

(86) PCT No.: PCT/EP2015/071421
§ 371 (c)(1),
(2) Date: Mar. 1, 2018

(87) PCT Pub. No.: WO2017/045722
PCT Pub. Date: Mar. 23, 2017

(65) Prior Publication Data
US 2018/0255117 A1    Sep. 6, 2018

(51) Int. Cl.
*H04L 29/06* (2006.01)
*H04L 1/18* (2006.01)

(52) U.S. Cl.
CPC ............ *H04L 65/60* (2013.01); *H04L 1/1835* (2013.01); *H04L 65/604* (2013.01); *H04L 65/80* (2013.01)

(58) Field of Classification Search
None
See application file for complete search history.

(56) References Cited

U.S. PATENT DOCUMENTS

| 2004/0125757 A1* | 7/2004 | Mela ................. H04L 29/06027 370/261 |
| 2004/0180701 A1* | 9/2004 | Livet ................. H04W 52/0261 455/574 |

(Continued)

FOREIGN PATENT DOCUMENTS

| JP | 2009-89416 A | 4/2009 |
| JP | 2010-171558 A | 8/2010 |
| WO | 2005112367 A1 | 11/2005 |

OTHER PUBLICATIONS

International Search Report and Written Opinion from corresponding International Patent Application No. PCT/EP2015/071421, dated Jun. 8, 2016.

(Continued)

*Primary Examiner* — Angela Nguyen
(74) *Attorney, Agent, or Firm* — Tucker Ellis LLP

(57) ABSTRACT

Method carried out in a radio terminal for playing streaming media, which terminal includes a modem for connecting to a radio network, and a data streaming client including a streaming data buffer for receiving streaming data from a streaming data server through the radio network, the method comprising transferring data buffer size information from the streaming client to the modem; signaling the network, by means of the modem, to indicate streaming service initiation and data buffer size; buffering media data of a streaming media file received through the network according to a buffer scheme adapted dependent on the data buffer size; playing streaming media generated from buffered media data; and signaling the network, by means of the modem, to indicate streaming service termination. A buffer filling signal may be received from the network, which includes a recommendation of a suitable instance for buffer filling, wherein the buffer scheme may be determined dependent on the received signal.

14 Claims, 6 Drawing Sheets

(56) References Cited

U.S. PATENT DOCUMENTS

| | | | |
|---|---|---|---|
| 2009/0285094 A1* | 11/2009 | Straub | H04L 29/06027 370/235 |
| 2014/0317241 A1 | 10/2014 | Zhao | |
| 2014/0372623 A1 | 12/2014 | Chen | |
| 2015/0237580 A1* | 8/2015 | Yu | H04W 52/0229 370/311 |
| 2015/0312803 A1* | 10/2015 | Yang | H04L 1/0078 370/252 |
| 2015/0382050 A1* | 12/2015 | Le Nerriec | H04L 45/16 725/80 |

OTHER PUBLICATIONS

Office Action from corresponding Japanese Application No. 2018-514861, dated Jun. 11, 2019.

* cited by examiner

METHODS AND DEVICES FOR CONTROLLING STREAMING OVER A RADIO NETWORK

TECHNICAL FIELD

This disclosure relates to improvements in the field of data streaming, and at least in part to solutions for adapting streaming data parameters so as to optimize terminal power consumption.

BACKGROUND

Mobile terminals, such as a smartphone or a tablet device, offer various services to their users. Given the popularity of streaming media, such as movies or other multimedia content, users can enjoy watching or listening to streaming media at various locations and virtually anytime. Currently, adaptive bit-rate streaming is a prominent technology used in the delivery of streaming media.

When a terminal is streaming multimedia, e.g. using http streaming protocol, the terminal is using a local streaming buffer. With this buffer the downloaded multimedia content over the mobile radio access network is temporarily cashed in order to ensure that a media player in the terminal will always be provided with data, independently of data mobile network transfer delays, temporarily slow data download etc. The terminal is in full control over when and with how much data the streaming buffer should be refilled.

SUMMARY

With the evolution of increased radio access data rates as well as increased memory available in terminals, the multimedia buffer can be relatively large. However these increased capabilities in both download data rates and buffer sizes introduces more complexity with respect to optimizing the multimedia buffer handling from network efficiency as well a battery consumption perspective. This increased complexity, and problems related thereto, are targeted by various solution outlined herein. Also when utilizing multimedia streaming for live video the various solutions outlined herein are applicable, since the optimization of local buffer handling is also a complex operation in such scenario. In a live streaming scenario the amount of buffering in the terminal should be as low as possible to minimize the end to end playback delay for the live stream, while there must always be data in the buffer to feed the multimedia playback function in the device.

According to a first aspect, a method carried out in a radio terminal for playing streaming media is proposed, which terminal includes a modem for connecting to a radio network, and a data streaming client including a streaming data buffer for receiving streaming data from a streaming data server through the radio network, the method comprising transferring data buffer size information from the streaming client to the modem;

signaling the network, by means of the modem, to indicate streaming service initiation and data buffer size;

buffering media data of a streaming media file received through the network according to a buffer scheme adapted dependent on the data buffer size;

playing streaming media generated from buffered media data.

The method may also include the step of signaling the network, by means of the modem, to indicate streaming service termination. As an alternative, termination of the streaming session may be gathered from expiration of a timer, or e.g. by receipt of an end of file indication from the streaming data server.

In one embodiment, the method comprises the step of receiving a buffer filling signal message from the network, which includes a recommendation of a suitable instance for buffer filling, and wherein the buffer scheme includes timing data for filling the buffer with received media data determined dependent on said suitable instance.

In one embodiment, the buffer filling signal message includes an indication of suitable amount of refill data to buffer at said suitable instance, and wherein the buffer scheme includes data burst size determined based on said suitable amount.

In one embodiment, the method comprises the steps of transferring timing data for instances of filling the buffer from the streaming client to the modem;

signaling the network, by means of the modem, to indicate the timing data.

In one embodiment, the buffer scheme includes receiving streaming data in data bursts corresponding to said data buffer size.

In one embodiment, the method comprises the steps of receiving a modem control signal from the network, applying power control of the modem between instances of buffering in accordance with the modem control signal.

In one embodiment, the method comprises the steps of determining a recommended compression level corresponding to instantaneous modem power consumption; and signaling the network to transmit streaming media data encoded based on the recommended compression level.

In accordance with a second aspect, a method carried out in a streaming scheduling device is proposed, which device is connected to a base station of a radio network for communicating with radio terminals, for controlling transfer of streaming media data from a streaming server to a modem of a first terminal over the radio network, comprising the steps of:

detecting a signal message, indicating a streaming service initiation at the terminal involving transmitting streaming data through said base station for reception in the first terminal, said signal message including an indication of data buffer size in the terminal;

assessing current radio network capacity; determining streaming buffer control data dependent on the network capacity and the data buffer size;

transmitting a buffer filling signal message, comprising the determined streaming buffer control data to the first terminal, for use in the terminal to control buffering.

In one embodiment, the buffer filling signal message comprises suitable instance for buffer filling, for use in the terminal to control buffering.

In one embodiment, the streaming buffer control data is determined dependent on one or more of:

aggregated data traffic load, including data traffic to instantaneous traffic load to all served data terminals;

incoming and outgoing data traffic timing for the first terminal;

mobility signaling for the first terminal;

instantaneous radio channel properties in the connection with the first terminal; and availability of cashed multimedia data within the radio network.

In one embodiment, the method comprises the steps of determining radio link information related to the connection between the network and the first terminal;

transmitting a codec selection instruction to a streaming data delivery unit, capable of delivering streaming data at a first higher compression level and at a second lower compression level, to select the second compression level dependent on the determined link information indicating that network capacity has increased over, or exceeds, a comparable capacity level.

In one embodiment, the control unit is communicatively connected to a local buffer connected to the base station, having a buffer size corresponding to said suitable amount, and configured to fill the local buffer with data blocks from the streaming server between said suitable instances.

According to a third aspect, a radio terminal for playing streaming media is proposed, comprising a modem configured to receive media data from a base station of a radio network;

a streaming buffer connected to the modem;

a media player connected to receive media data from the streaming buffer for playing streaming media;

a controller configured to generate a signal message to the network to indicate streaming service initiation, and to receive a buffer filling signal message from the network, wherein the controller is configured to control filling of the buffer based on the received buffer filling signal message.

In one embodiment, the controller is configured to initiate buffer filling at a point in time determined based on a recommendation of a suitable instance for buffer filling.

In one embodiment, the buffer filling signal message includes an indication of suitable amount of refill data to buffer at said suitable instance, and wherein the step of buffering includes buffering the suitable amount of data at the suitable instance.

BRIEF DESCRIPTION OF THE DRAWINGS

Various embodiments of the invention will be described below with reference to the accompanying drawings, in which FIG. 1 schematically illustrates a system setup for media streaming from a server to a terminal through a radio network.

DETAILED DESCRIPTION OF EMBODIMENTS

A detailed description of various embodiments will now be described with reference to the drawings. This description provides detailed examples of certain possible implementations, but it should be noted that the details are intended to be exemplary and in no way limit the scope of the application. In addition, embodiments other than those described in detail may be put to practice.

Figure 1:
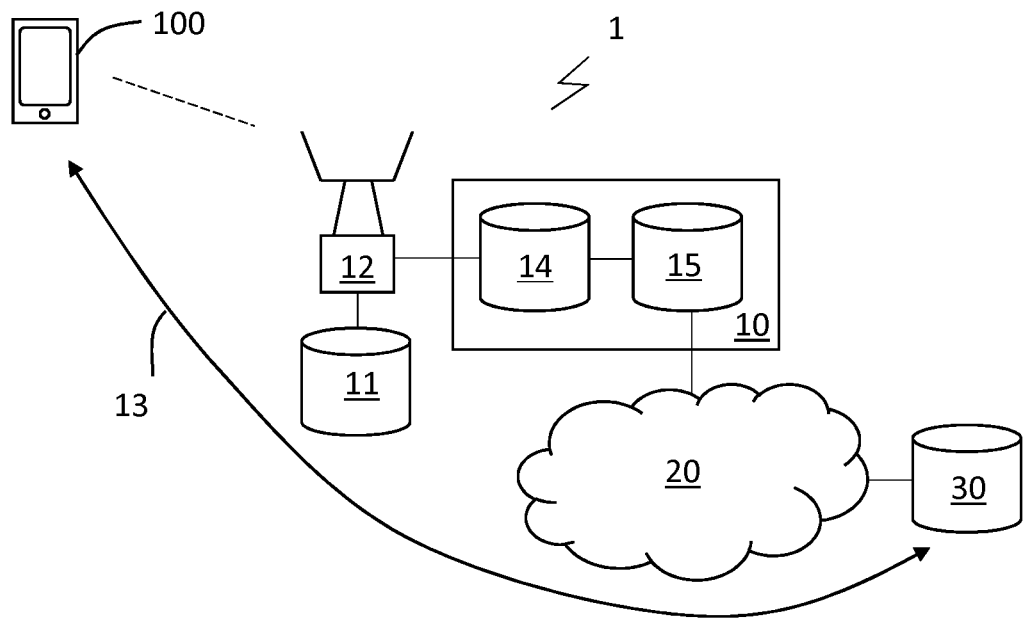

As a basis for setting the scene of the solutions proposed herein, a system setup for media streaming is shown by way of example in FIG. 1. The term streaming media as intended herein may basically be multimedia that is constantly or intermittently received by and presented to a user through a terminal 100, while being delivered by a provider from e.g. a server 30. The media server 30 may as such be located in the vicinity of the terminal 100, but is generally arranged at a remote location. Contrary to media completely stored locally in the terminal 100, the streaming media data is relayed to the terminal 100 in a stream of data as packets or segments and buffered in the terminal before being decoded and played by a media player in the terminal 100.

When media content is to be accessed and played, a streaming session 13 may be setup between the media server 30 and the terminal 100. In the drawing, the terminal 100 is connected to a streaming media content server 30 on Internet 20, via a cellular radio access network 1. In the media streaming protocol there is an end-to-end connectivity protocol between the terminal 100 and the content server 30, as indicated by the arrow 13. This end-to-end communication typically uses an adaptive bit rate (ABR) protocol, e.g. MPEG DASH. Regardless of end-to-end protocol, the media data also needs to be transported over some form of carrier. As mentioned, media streaming may be carried out over at least a radio communications network 1, in which a radio communication link is used between the terminal and a base station 12 in the radio network 1, indicated by the dashed line. The base station 12 is connected to a core network 10, to which a plurality of other base stations may also be connected. The core network 10 may furthermore be connected to other networks through the Internet 20. Different terms may be used for the terminal 100 and different radio network nodes, dependent on the specific radio system, such as in WCDMA, CDMA200, LTE etc. For the sake of simplicity, though, terminal 100 will be used to denote the device which is connectable by means of a radio link to the radio network 1, and base station 12 for the network node providing the radio interface to the terminal 100. The terminal 100 may e.g. be a mobile telephone or a portable computer, such as a tablet, or simply a media rendering device connectable to the radio network for receiving streaming media. The streaming media may be multimedia, including audio and video, or simply one of those. For the sake of explaining various embodiments, though, streaming video data may be mentioned.

Figure 2:
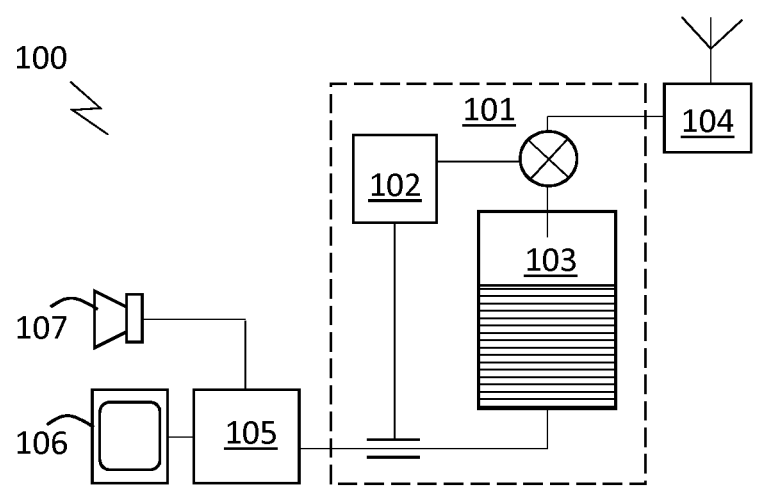
FIG. 2 illustrates an exemplary terminal configured for receiving streaming media data and playing streaming media.

FIG. 2 schematically illustrates an exemplary terminal 100 according to an embodiment, in terms of functional elements. Needless to say, the terminal 100 preferably also comprises some form of casing or chassis, but the physical embodiment of the terminal 100 is not important for the understanding of the solutions proposed herein. The terminal 100 may comprise a modem 104 connected to an antenna, for providing a radio link to a radio network 1. The terminal 100 further includes a streaming client 101, illustrated in the drawing to include at least a controller 102 and a streaming buffer 103. The controller 102 may comprise a microprocessor and associated program code stored in a memory, which may be executed by the microprocessor in the controller 102 so as to control a streaming media session in accordance with the solutions outlined herein. The controller 102 may also control the modem to signal messages to the radio network 1, as will be explained further below.

The buffer 103 may be connected to the modem 104 for receiving streaming media data transmitted over a radio network 1. A media player 105 is connected to receive media data from the streaming buffer 103, under control by controller 102, for playing streaming media. The media player 105 may also include a media data decoder, or a decoder may be provided separately. A media output member is connected to output played media, such as a display 106 for presenting video from a streaming video service, or a speaker 107 for presenting audio, either together with the presentation of video, or as a separate output from a streaming audio service. In an alternative embodiment, the terminal 100 may lack one or both of the output members for video 106 and audio 107, and merely provide connectors (not shown) for connection of an auxiliary video or audio output device.

Figure 3:
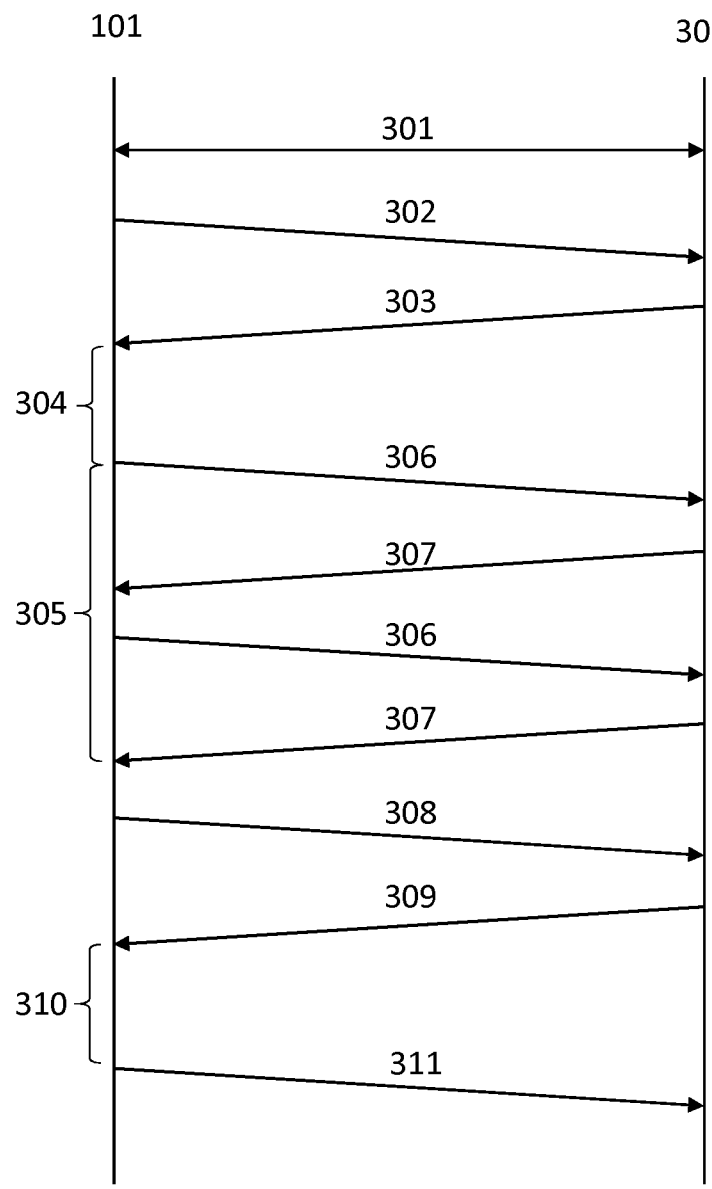
FIG. 3 illustrates general communication between a server and a client during a streaming media session.

FIG. 3 illustrates media streaming according to one state of the art scenario, between a streaming client 101 in a user terminal 100, and a streaming media server 30. In a first step 301, a connection setup is carried out between the client 101 and the server 30 to create a streaming session 13. This may be carried out over a radio network 1 asking for the whole media file from start. In a subsequent step 302 the client 101 may ask the media provider server 30 for a certain file, such as a movie, within the streaming service. In a later step 303, file transfer is then initiated from the server 30 to the client 101. When carried out over the radio network 1, media data will fill the buffer, and under control by the controller 102, the media data will be taken from the buffer to the media player 105 for rendering of the media. Under normal conditions, filling of the buffer is decisively faster than the rate of withdrawal, such that the played media may be enjoyed without interruption. During a period 304 of filling of the buffer 103, data may also be played, but at some point the buffer 103 may be full, completely or to a certain predetermined degree, if the whole file has been requested in step 302. After the filling period 304, a period 305 may follow, during which a series of communication will take place. When the buffer has been filled, at the end of period 304, a message 306 is signaled to the server to that effect, such as by indicating "Receive window=0". After a certain time period, the server 30 will then signal a "Check receive window" message 307 to the client 101. The period 305 may be determined by the time until the buffer fill level has fallen to a certain predetermined degree or threshold, and no refilling of the buffer 103 will be carried out until that level has been reached. Until the buffer re-fill level has been reached, a "Check receive window" signal 307 will be responded to with a "Receive window=0" signal 306, which may be repeated several times during the period 305. In a session according to an HTTP streaming protocol, e.g., filling up of the buffer 103 may be followed by frequent messages 307, e.g. with 5 sec periodicity, from the server 30 checking when the client 101 is ready to receive additional data.

As mentioned, the multimedia buffer 103 can be relatively large in a streaming buffer 103 of a state of the art terminal 100, which may decrease the risk of emptying the buffer when there is poor radio access to receive new streaming data. However, it may still not always be wise for the terminal 100 to try to fill a large multimedia buffer 103, e.g. during a radio access fading dip, when the instantaneous data rate is relatively low, or the required modem transmission output power is relatively high. Also, from a radio network perspective, the aggregated data traffic load will vary over time and in order to optimize the system capacity there may be instances more suitable than others to increase the locally cashed buffer.

In accordance with one embodiment, a concept is proposed for network-assisted streaming multimedia buffer control, with the purpose to optimize the modem data traffic utilization in terminal power consumption and network system capacity perspective.

Figure 4:
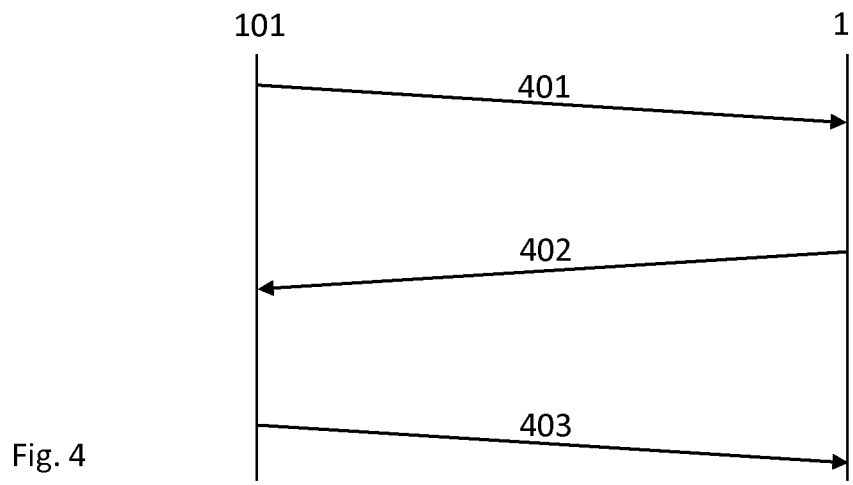
FIG. 4 illustrates network signaling messages within a radio access protocol for improving media streaming control according to an embodiment.

FIG. 4 schematically illustrates a flow chart of one embodiment, introducing network signaling messages within the radio access protocol to enable terminal streaming buffer control with very low signaling latency. The method depicted in FIG. 4 is carried out between the terminal 100, preferably under control by the media streaming client 101, and the radio network 1, and relates to playing streaming media in the terminal. The terminal also includes a modem 104 for connecting to the radio network 1. The data streaming client 101 includes a streaming data buffer 103 for receiving streaming data from the streaming data server 30 through the radio network 1.

At step 401, data buffer 103 size information is transferred from the streaming client 101 to the modem 104, which executes the signaling step 401 through a radio transceiver and an antenna. The streaming data client 101 in the terminal 100 thus signals the network 1 by means of the modem 104, to indicate streaming service initiation and data buffer size. The terminal may thus proceed in a streaming session to receive streaming data from a server 30, whereby data for refilling the buffer 103 is sent through the network 1. The signaled buffer size may be maximum buffer size for data buffer 103, or a size measure which is lower than it maximum buffer size.

The signal sent in step 401, indicating streaming service initiation and an indication of data buffer size in the terminal, is detected in a node in the network 1, e.g. a network scheduler, such as in a node in the core network 10 or in a node 11 closely connected to the base station 12 with which the terminal modem 104 is communicatively connected over a radio interface. Responsive to the signal reception, at least current radio network capacity is assessed, the purpose being to determine streaming buffer control data, for controlling filling of the buffer 103.

At step 402, a buffer filling signal message, comprising the determined streaming buffer control data, is sent to the terminal 100, for use in the terminal 100 to control buffering by the streaming data client 101. The terminal 100 may then control buffering of media data in buffer 103, which data is related to a streaming media file received through the network 1, according to a buffer scheme dependent on the data buffer 103 size. More specifically, the buffer scheme may be run by controller 102 of the streaming data client, but it may take into account the received buffer control data. As an example, the buffer control data may indicate a suggestion of time point to start buffer refill, and preferably also suggested amount of refill data size at that point in time. This control data may have been assessed in the network 1 dependent on various parameters, including network capacity. In addition, the network 1, e.g. a network scheduler, scheduler can take many parameters into account in order to improve both terminal 100 power consumption as well as overall system data capacity. Parameters that may be considered are e.g. total aggregated instantaneous system data traffic load, being able to maximize data transfer speed for each buffer refill. Incoming/outgoing data traffic for the specific terminal 100 may also be assessed, for synchronization of buffer refills with other data traffic in order to minimize the active modem time. Mobility signaling may also be taken into account, limiting buffer refills during handover procedures, and ensuring buffer refills are made when terminal is connected to most optimal base station. Instantaneous radio channel properties may be assessed, for maximizing the data rate based on e.g. channel fading. In addition, any available cashed multimedia data within the network is preferably taken into account. When cashing of streaming data is possible close to the radio interface of the network 1, the buffering scheme should be configured such that streaming can always be taken from the network cash, so as to avoid scenarios where data needs to be directly transferred from the streaming server 30, which could limit the possible download data rate. Other parameters on which to base the buffer control data are conceivable, as alternatives or in combination with the ones mentioned above, for providing a suggestion on time point to start buffer refill, and amount to refill.

When streaming media data is received in the terminal 100 and cashed in the buffer 103, a media player 105 will play the streaming media generated from the buffered media data, such as by outputting audio and or video to a user.

In step 403, the streaming client 101 in the terminal 100 signals the radio network 1, by means of the modem 104, to indicate streaming service termination. After that, no buffer control data needs to be received.

The signaling step 402 relates to data to be received from the network, rather than to data already received. The buffer control data must therefore be received in advance in the terminal 100, so as to be able to adapt the buffer scheme. Also, the buffer control data, related to time and data size, is as such independent of the media file to be received. Instead, this buffer control data relates to taking radio network 1 parameters into account. These messages, signaled in steps 401, 402 and 403, could be included into 3GPP specifications at different levels. One possible example could be to include the signals as new signaling messages in RRC signaling, and could in that case e.g. be included as "other" messaging section in 36.331 for LTE. Another possibility would be to include this as a new physical layer procedure into 36.213 for LTE. Other solutions could be applicable in other radio communication specifications, as will be understood by the skilled person.

Referring back to FIG. 3, if the streaming process is set up such that the client 101 asks for the whole file from start, according to the state of the art, the streaming client 101 will need to communicate to the streaming server 30 when the streaming buffer 103 is full. This drawback may be partly overcome by using a streaming buffer 103 of increased size and a HTTP streaming functionality here denoted as "range retrieval". With the range retrieval functionality the streaming client will ask the streaming server for a specific range of the media file at each streaming buffer filling request, instead of asking for the whole media file from start. As outlined with reference to FIG. 4, the buffer scheme be configured to take buffer control data, received from the radio network 1, into account when determining e.g. time and or size of streaming data to be received from the server 30. With the range retrieval functionality each buffer re-fill can be handled as a separate process by the server 30, and buffer status messages will no longer be required to be sent. Instead the communication link may be silent between buffer refills.

Figure 5:
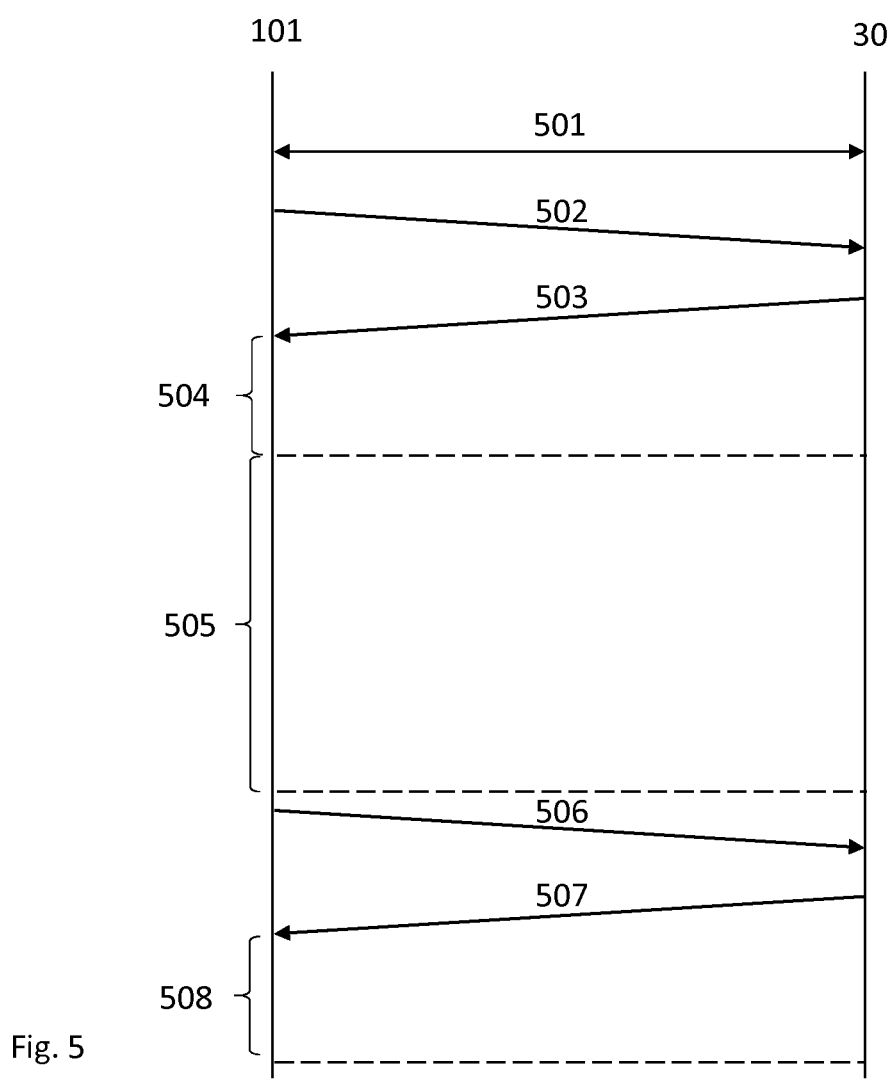
FIG. 5 illustrates server to client communication during a streaming media session with a range retrieval functionality where each buffer re-fill is be handled as a separate process by the server, according to an embodiment.

FIG. 5 illustrates the range retrieval communication process according to one embodiment.

In a first step 501, a connection setup step is carried out between a streaming client 101 in the terminal 100, and the streaming media server 30, which are connected over a radio communications network 1.

In step 502, the streaming client 101 signals the server 30 to ask for a first range of a media file.

In step 503, the first range of the media file is transferred from the server 30 to the media client 101.

For a period 504 the buffer 103 will be filled with data until it is substantially full, or full to a predetermined level, indicated by a dashed line in the drawing. Withdrawal of data from the buffer 103 for playing streaming media may be initiated at any time after the first data of the first range is received at the beginning of period 504.

The following period 505 may be silent in terms of both signaling and data transfer between the client 101 and the server 30, since the server is configured not to check for the need for buffer re-fill as in the procedure of FIG. 3. This silent period may proceed until there is a need to refill the buffer 103, indicated by the next dashed line in the drawing.

In step 506, subsequently, the client 101 asks for the next range of data of the media file, corresponding to step 502.

In step 507, the second range of data is transferred to the client 101 from the server.

With reference to the description outlined with reference to FIG. 4, one or more parameters on which buffer control data may be assessed in the radio network, may have changed since retrieving the first range of data. Hence, buffer control data may e.g. be signaled to the streaming client 101 (as in step 402) prior to determining the size of the range requested in step 506. Alternatively, the start of the transfer of data of the second range in step 507 may include buffer control data to the streaming client, which involves an adaptation of the requested size of the second range, determined in the network based on the current parameters, as outlined with reference to FIG. 4. A buffer scheme operated by controller 102 in the streaming client may then take into account that the received second range is in fact different from the requested second range, typically smaller.

In period 508, filling of the buffer 103 continues, from the received streaming data, corresponding to period 504.

From terminal battery consumption perspective the silent periods between buffer refills may be important. When the communication modem 104 is not used, there are time gaps available for the modem 104 to enter low power states, or in other manner reduce its activity. One key issue in order to use such methods of reducing terminal modem activities in the silent periods is however that according to e.g. 3GPP protocols the network 1 is in control over power modes and allowed modem inactivity periods.

Figure 6:
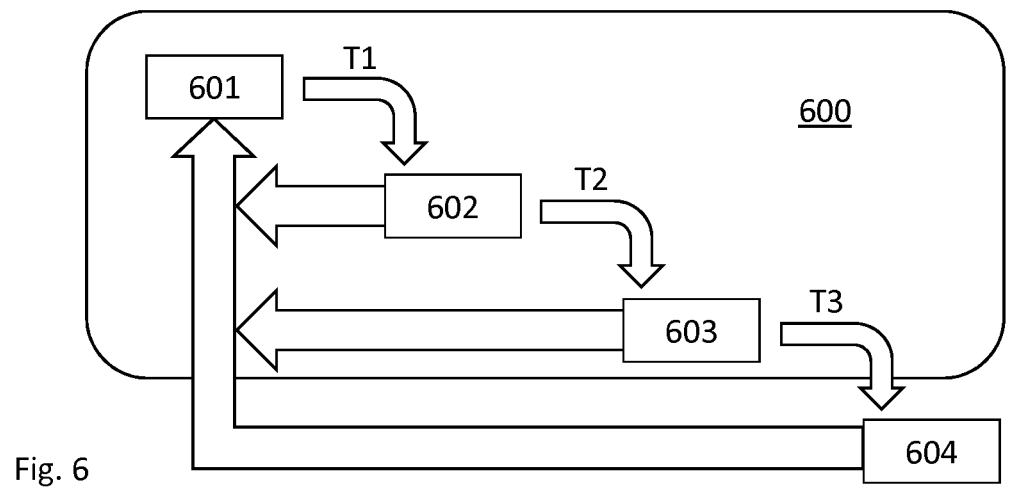
FIG. 6 schematically indicates parameters determining power saving states controlled by the network of a radio system.

FIG. 6 schematically illustrates various power saving states for a terminal modem 104 operating with a radio network 1. The larger encircled area 600 denotes a connected state, between the modem 104 and the network 1, in which 601 indicates a state of full activity. This may mean that some form of service is presently running that prevents the modem from disconnecting, or at least that data communication occurs frequently enough to prevent any timer from exceeded.

T1 represents a first inactivity timer, and when this timer has been exceeded, the modem may be set to a short DRX (Discontinuous reception) cycle state 602. In the embodiment of FIG. 6, the modem 104 will stay in that state until either a second timer T2 has been exceeded, at which a long DRX cycle state 603 is set, or data transfer is again detected, whereby the modem 104 goes back to the fully active state 601. A similar scheme may be applied in the Long DRX state 603 of the connected mode. Unless data transfer is detected during the time frame of a third timer T3 of Long DRX, the modem 104 will disconnect to idle mode 604. Detected data transfer during T3 will instead set the modem 104 back to the fully active state 601.

However, specifically for LTE, the parameters determining power saving states as illustrated in FIG. 6 are all controlled by the network, while for the WCDMA/HSPA standard there is a functionality called fast dormancy where terminal can indicate it's wish to enter a low power state. In any case, although the client/server communication can be optimized as in FIG. 5 to create silent periods, the radio access network parameters or other modem utilization control signaling needs to be aligned in order for terminal to take benefit of the silent periods to reduce e.g. modem radio duty cycle. According to one aspect, a solution is proposed for optimizing radio network usage of silent periods in the absence of fast dormancy signaling. Since the periodicity will be varying over time depending on e.g. media content, client buffer size and radio access data rates it will be difficult to statically set good parameters, such as T1, T2 and T3 referred to in FIG. 6. One example of power save strategy by the network may be to set a high value of long DRX cycle and long value of T3. Due to the long DRX value this may result in good multimedia streaming power consumption between data bursts and the long T3 value may avoid state changes during inactivity periods. However for other more sporadic services without regular traffic requests this will keep terminals in active mode during long time, and new data requests may be impacted by long latency. And since many use cases will be run on the same quality of service class in the radio access networks it is not realistic to believe such optimizations can be done on service level based on today's solutions.

For this purpose, the possibility of control signaling would need to be added into communication protocol specification, e.g. into 3GPP specifications for LTE. One possibility for the location of such signaling in 3GPP specifications could be in LTE RRC specifications TS 36.331. As one example this may be included as part of RRC connection reestablishment. It could also be part of layer 1 signaling, e.g. as part of physical layer procedures in TS 36.213. The signal would be in the direction from terminal to base station and could be based on adding as little as one bit that corresponds to on/off signaling for the repeatable pattern, but could require more bits for additional signaling. Preferably, it would also involve signaling of a set of bits to indicate the expected burst size. Note that this solution is different from concepts where a terminal would suggest parameters to the network or indicate specific QoS requirements etc. In this proposal the terminal is making the radio access network aware of the expected repeatable pattern, while network still have full control over all configurations e.g. DRX and timer parameter settings.

In order to minimize control signaling overhead there is no expected explicit response from base station to terminal for this control signaling, in the embodiment outlined with reference to FIGS. 5 and 6. On the contrary it is expected that the network base station 12 takes this control signal into account in its further handling of power save related settings for e.g. DRX cycles and inactivity timers such as T1, T2 or T3.

A benefits of this embodiment would, for the network, be that it may be use case aware with regard to a streaming service provided over the radio network. This may e.g. be useful for a very common streaming use case that consumes a significant amount of data resources. It will then be possible to dynamically set state transition related parameters and DRX cycles etc. in order to minimize control signaling load from unnecessary state transitions, and also to improve terminal power consumption. As an example, if it has been established that a streaming media service has initiated, and that a certain periodicity of a certain burst size transfer will be carried out to the client 101 from the base station 12, one or more of timers T1-T3 may set so that the modem 104 goes to a lower and less power consuming state shortly after the entire burst has been transferred, without requiring feedback from the modem 104. The timer(s) may e.g. be signaled to the modem 104 from the base station 12.

As an alternative embodiment of this solution, the operator core network 10 may be in communication with the streaming server 30, and get same type of information, i.e. repeatable pattern transfer starting and expected burst size, from the server 30. Since the server 30 is assumed to be located on Internet 20, this may require IP based solutions, not standardized in e.g. 3GPP. In such an embodiment the core network 10 may, after receiving the traffic information, transfer that information to the radio access base station 12, in order to optimize the radio protocol settings. Otherwise, this alternative embodiment would benefit from the same advantages as the embodiment explained with reference to FIG. 5.

In the embodiments outlined above, it has been proposed to add a signaling possibility into the standardized radio access protocol for informing the radio access network 1 about initiation/ending of a repeated traffic pattern. This constitutes a solution for informing the network 1 about usage of range retrieval for streaming, so that the network 1 can take appropriate actions for improving radio access parameters, e.g. for DRX settings and inactivity timers etc. When a streaming session 13 is initiated by a wireless terminal 100 used in a mobile wireless communication network 1, as shown in image 1, the streaming server 30 will start deliver data according to the streaming session parameters agreed with the client 101. Essentially, on a high level abstraction, this data may be forwarded to the base station 12 via the Internet 20 and the mobile radio core network 10 and thereafter transferred to the terminal 100 via the wireless base station 12. In many networks one major data traffic capacity bottle neck is the radio interface between terminal 100 and base station 12. Hence it is important to optimize the usage of this interface. One technology for optimizing the radio link for streaming sessions 13 is to use local data cashing in a node 14 within the radio access core network 10, or in a node 11 in connection with the access network and the base station 12, as illustrated in image 2. With such solution the network 1 may identify the initiation of a data stream towards a specific Internet server 30 and temporarily store/cache media content within a buffer 11 in the radio access interface or a buffer 14 located within core network 10 close to the radio access interface. This may be done in order to adjust the data delivery over the radio access network and air interface independently of the delivery pace from the streaming server 30. In one embodiment, a new concept of end to end data flow optimization of e.g. multimedia streaming 13 by building on the embodiment outlined above, combined with a local data cashing. With this proposal the local data caching can be dynamically adjusted to adopt the buffering strategy defined by client-server communication.

Figure 7:
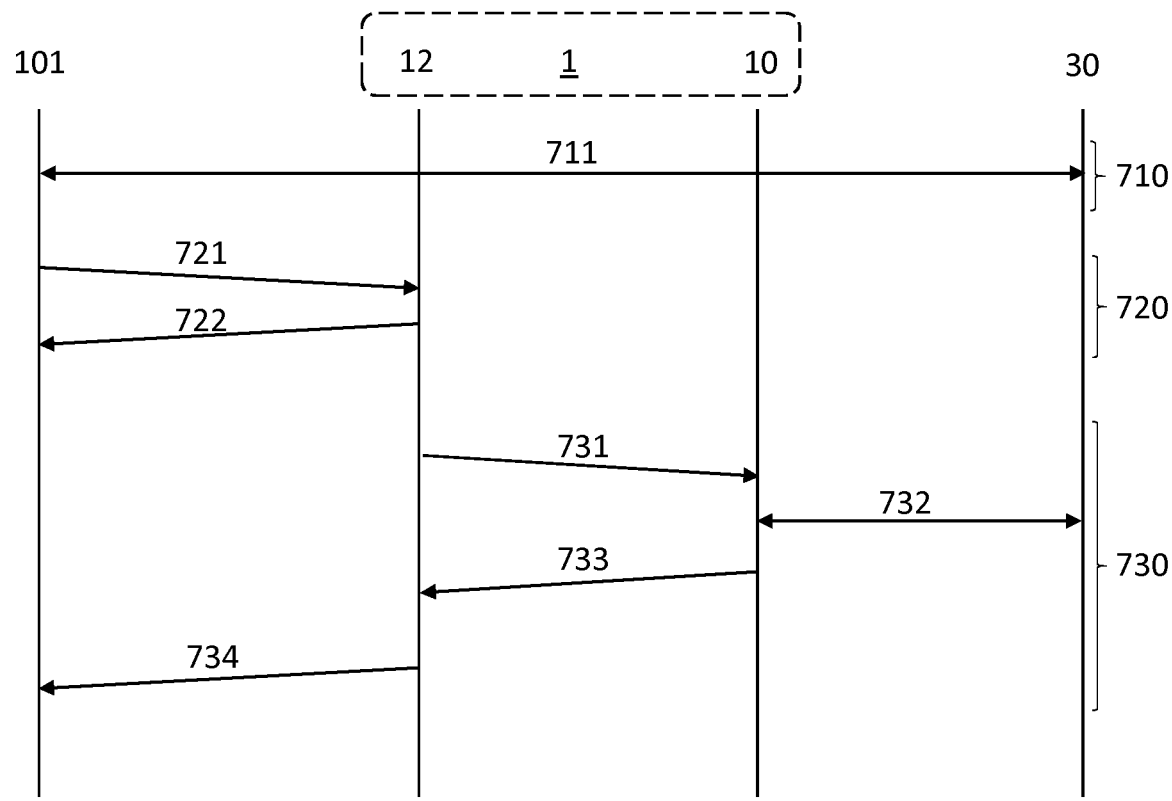
FIG. 7 schematically illustrates a streaming process including network-initiated data flow adjustments based on information received from terminal, with cashing to quickly buffer data in the radio network.

FIG. 7 illustrates an embodiment based on cascading client-server agreed data flow into operator core network 10 for optimized end-to-end data flow, e.g. by improved local caching parameter alignment. In this embodiment, the network 1 is specifically made aware of terminal 100 usage of range retrieval. In the drawing, a streaming client 101 in the application entity of a terminal 100 has a possibility to provide information to the modem 104 about a setup of a repeatable data traffic (e.g. streaming) session, and to provide relevant parameters to the modem 104. With this information available in the modem 104, the modem 104 can send information to the radio access network base station 12, via a standardized protocol (e.g. 3GPP protocol), about initiation and termination of a relatively repeatable traffic pattern, e.g. due to a multimedia streaming session. As already noted, the modem 104 may also send an indicative value of the data burst size, which could correspond to the multimedia streaming buffer 103 size.

In a first phase 710, a streaming session setup process 711 is carried out between the client 101 and the streaming server 30, over the radio network 1. In this exemplary embodiment, the media streaming client is communicating with the streaming server 30 and decides to use a range retrieval methodology for content delivery. The client decides to fetch e.g. 20 MB of data of the total the media content file in each range.

In a second phase 720, the client 101 may inform 721 the radio network 1 of the initiation of the streaming session, and the agreed streaming parameters, such as the burst size of 20 MB. This information may e.g. be signaled in a radio access protocol such as LTE RRC specifications TS 36.331, e.g. as part of RRC connection reestablishment, or as a part of layer 1 signaling in physical layer procedures in TS 36.213.

This may be followed by a step of parameter tuning 722 based on various radio parameters, as outlined with respect to FIG. 4 above, e.g. DRX and/or inactivity timers or other system parameters set based on inter alia the streaming parameters such as burst size, and on radio network load and capacity parameters. An outcome of the second phase 720 is that there is a known pattern for data burst transfer agreed between the client 101 and the network 1.

In a third phase 730, the network 1 initiates data flow adjustments based on the information received from terminal 100 in second phase 720.

In step 731, the radio access network 12 may inform the core network 10 of the agreed pattern.

Subsequently, in step 732, the core network 12 fetches data from the server 30.

In step 733 the core network 10 sends data to the radio access network 12.

The third phase 730 may include initiation of local data caching in a node 11 or 14 to quickly buffer blocks of 20MB data from the streaming server 30 and adapt the radio access network scheduling to deliver the 20MB blocks in an efficient manner. This way, this node 11 or 14 can be supplied with data at e.g. an even flow, or at a rate which is takes into account other data transfer in the network. This way, transmission to the client 101 can be carried out from a temporary memory cash in that node 11 or 14. This has the effect of eliminating streaming problems caused by e.g. a temporary reduction in data speed in the network 1 or the Internet, or access problems at the server 30, at the time the buffer 103 is to be re-filled.

In step 734, the client 101 receives data in the in a flow optimized with regard to the client, and preferably also with respect to other radio parameters.

The embodiment of FIG. 7 thus entails the possibility to conduct the third phase 730, i.e. aligning the network data flow optimizations with the agreed client-server parameters. The network local data caching can use a buffer size that is optimized towards the current client-server traffic flow. In this manner the complete end to end traffic path could be adjusted to achieve high capacity and low network delay, as well as low terminal power consumption since it minimizes the risk for different data flow strategies in independent parts of the end to end transmission chain.

Multimedia streaming 13 is a common use case in mobile communication systems. For particularly video content there is a continuous evolution of codecs to higher compression levels, where the primary goal of new multimedia codecs typically is to reduce the required transfer data rate when distributing the media. However with the evolution of new codecs having higher and higher compression levels a negative effect often is increased decoding complexity in the receiving end. The required computational complexity, and thereby power consumption in the receiving terminal 100, is therefore typically increased for the higher compressed content.

The reduction of required transfer data rate is created in order to handle demand for higher system capacity when network 1 load increases over time. However, all networks are not always fully congested. A wireless network base station 12 in e.g. a Wi-Fi, 3G or LTE network, can have available capacity many hours each day, even if the "busy hour" can be fully loaded. The inventor therefore suggests the idea of reducing terminal power consumption rather than required radio link data rates, during time instants when radio link capacity is available. This could be particularly beneficial for small cell deployments and Wi-Fi networks where capacity could be heavily varying over time, while required terminal transmission output power is typically very low.

When considering the total power consumption in a wireless terminal 100 receiving encoded multimedia content this leads to an optimization problem:

On one hand the less amount of data to be received, the lower modem utilization and thereby the lower power consumption;

On the other hand a lower amount of data to be received is realized by means of more compact media encoding. And the more compact encoded the higher required computational requirement on the media decoder unit in the terminal, and thereby higher power consumption.

In order to optimize power consumption there should be a possibility to adaptively adjust these parameters. In one embodiment, it is therefore suggested to adapt codec compression level for multimedia delivery in mobile communication networks 1, taking current network capacity and terminal power consumption into account. In other words, the object is to reduce terminal 100 power consumption by means of transferring multimedia with a high complex codec when the modem 104 power consumption is high, and with a lower complexity codec when the modem 104 power consumption is low. One very important aspect of the modem 104 power consumption is the current transmit power, since the radio transmitter, especially the power amplifier, in the terminal 100 has an exponential increase in power consumption typically from output levels of 0 dBm and higher. The cost per bit in terms of mA will therefore differ significantly depending on the terminal transmit power. While the streaming data is received in the terminal, a substantial amount of control signals are also transmitted from the terminal 100 through the network 1, such as quality reports and ACK/NACK indicators. On the other hand, the cost per decoded bit in terms of mA will vary then the codec is changed.

Figure 8:
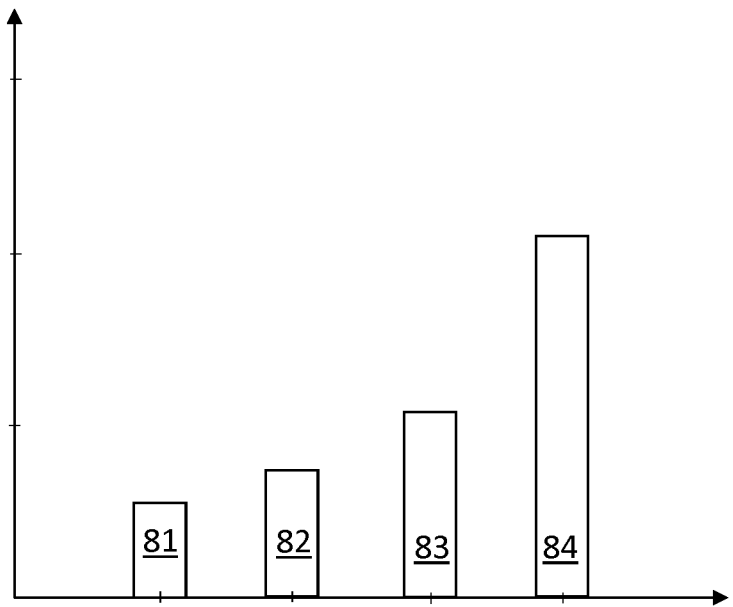
FIG. 8 illustrates cost per decoded bit of a video stream in terms of current consumption dependent on codec type.

FIG. 8 shows an example illustration of the instantaneous power consumption per decoded bit in e.g. mA, for decoding and playing multimedia, where the vertical axis represents current and the horizontal axis represents encoding compression type. In real terms this would be implementation dependent, the real and relative levels of FIG. 8 being merely exemplary. The leftmost bar 81 represents uncoded data, which means all data transmitted, and thus a large data burst or segment. The "decoding" and playing, though, requires little power from the terminal 100. The following bars to the right indicate examples of data encoded by H.263 in 82, H.264 in 83 and H.265 in 84. Again, the higher the compression, the lower amount of data transmitted but the higher the power consumption on the decoder in the terminal 100.

Two embodiments for arranging a codec or compression level selection with respect to modem power consumption will be outlined.

One embodiment is based on network-assisted codec selection. It is here proposed that control logic in the radio network 1 collects radio link information, such as available link capacity in the connection between the network 1 and the terminal 100. For an LTE system, this information is available within the base station 12 as of today (eNodeB). The control logic may also use terminal 100 related information that is available in the base station 12, e.g. estimated terminal output power, taken from power commands. Based on this information the control logic may be configured to transmit a codec selection instruction to a content delivery unit, so that the terminal 100 power consumption can be reduced when additional network capacity is available. This embodiment could be implemented without modifying any specifications of communication protocols.

Another embodiment is based on terminal-assisted codec selection. In this embodiment the receiving terminal 100 is configured to send compression level recommendations to the network 1. Such recommendations may be based on e.g. implementation knowledge in the terminal 100 of decoding computational complexity and instantaneous modem power consumption. The network 1 may be configured to consider this recommendation in combination with current network load, and transmit codec selection instruction to the content delivery unit. This embodiment may require a protocol modification to allow for terminal-server communication to include terminal assistance data. Such modification could e.g. be done to modify the protocols for adaptive streaming (HLS/DASH), to include field(s) for terminal recommendations on compression, or possibly information on the current required terminal power consumption.

The content delivery unit could be a part of the multimedia content source 30, e.g. a video server on Internet 20, or it could be a transcoding unit 11 or 14 as part of the operator network 1.

In case of multimedia streaming over a mobile radio access network 1 the available end-to-end data rate will typically vary over time, due to radio condition variations in the base station-to-terminal radio link as well as overall capacity variations in the radio access network. In order to handle the variations in the available data rate in a multimedia streaming use case the transferred data stream can be varied over time by means of adaptive streaming technologies. Examples of such technologies are MPEG-DASH and HLS, where the streaming content is delivered in segments where each segment consists of data for 5-10 seconds of playback time. Each multimedia segment can be available on the streaming server 30 in many different realizations/variants, e.g. being encoded into different image resolution qualities with different codecs. The decision on what segment variant to select over time and when to request new segments to be downloaded is taken by the streaming client 101 within the mobile terminal 100. When the end to end data rate is high the terminal could select high quality encoded segments, while a less quality encoded segments could be used when the end to end data rate is low.

According to one aspect a solution is hereby proposed for how a terminal streaming algorithm, run in a streaming client 101, could handle a situation when the network 1 sends assistance data to the terminal 100. It should be noted that the proposed terminal streaming algorithm solution would work independent regardless of whether such assistance data is available or not, and for receiving data over any type of radio access system such as Wi-Fi, cellular network etc. This proposition is based on the configuration that the terminal 100 is set to decide if to request control signaling assistance from radio network 1, and how such information could be used in adaptive streaming client 101 for segment selection and streaming buffer 103 control.

Figure 9:
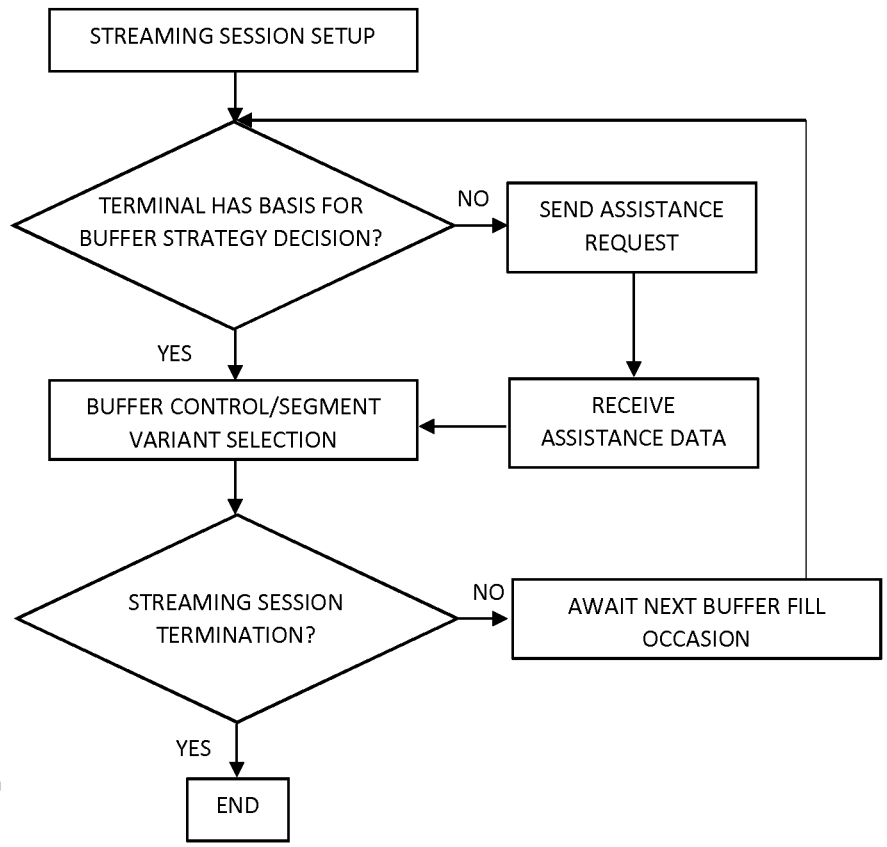
FIG. 9 schematically illustrates an example of adaptive streaming algorithm functionality of one embodiment.

FIG. 9 illustrates, by way of example, an embodiment of a flow chart for an adaptive streaming algorithm functionality for the proposed terminal concept.

Upon streaming session setup, when the streaming session is started, the terminal 100 should select a suitable video codec. Examples of such codecs may include the ones indicated in FIG. 7. The terminal 100, more specifically the streaming client 101, could base this selection on relevant information already available within the terminal, e.g. historical data rates on the same radio bearer. This data may e.g. be based on data taken from the modem, and stored by the controller 102. The exact parameters taken into account in this selection are not specifically outlined herein, although they may include any one of the parameters given in the description provided with reference to FIG. 4.

However, as one new aspect in this embodiment, it is proposed to include an accuracy/validity check of this terminal information, in which it is checked, in the terminal 100, whether it has sufficient basis for a buffer strategy decision.

If the available information in the terminal 100 is considered as not accurate enough, the terminal algorithm will decide to transmit a request to the radio network 1 to send streaming assistance data. This may be the situation e.g. when there is no or too little information available data in the terminal 100, such as too little historical data, or the data rate history is collected many seconds/minutes ago and assumed not accurate/valid. In the radio network 1 there may be solutions and protocols included in the radio access network nodes, towards a terminal could send assistance requests. In a network node 15, such as a packet gateway, the streaming session can be identified, and the node 15 may include or be connected to streaming assistance logic.

The streaming client 101 in the terminal 100 may thereby receive assistance data sent from the network 1. This assistance data may include prediction/allocation information, transferred to the terminal streaming client 101, in order for it to take into account the relevant data in the adaptive streaming algorithm carried out by the controller 102. The transferring of such information could be done in several ways, e.g. involving a data scheduler in the base station 12, by means of incorporating the network assistance into one of existing communication protocols between terminal and radio access network. Examples of implementation could be to modify the streaming protocol (e.g. MPEG DASH) to include a network data rate indicator field, and allow for intermediate nodes to read and modify that data field. Other examples could be to utilize information fields in applied protocols such as HTTP headers, where radio access network nodes could insert streaming assistance information.

Parameters available in the terminal 100 beforehand, and assistance data received from the network where applicable, may then be taken into account in a step of selecting segment variant, i.e. according to codec of choice, and/or buffer control, e.g. in terms of size and/or time for burst receipt. As an additional aspect the terminal 100 may consider what radio access technology (RAT) currently is used by the terminal modem entity for the assistance data collection. Based on RAT usage the assistance information request could be different, depending on what type of implementation, e.g. from above typically is available in different RAT:s.

The streaming algorithm will also intermittently check for an identification of a termination of the streaming service session. Such termination may be caused by end of file, or e.g. by a user terminating the session.

If the session continues, the client 101 will await the next, agreed, buffer fill occasion.

Figure 10:
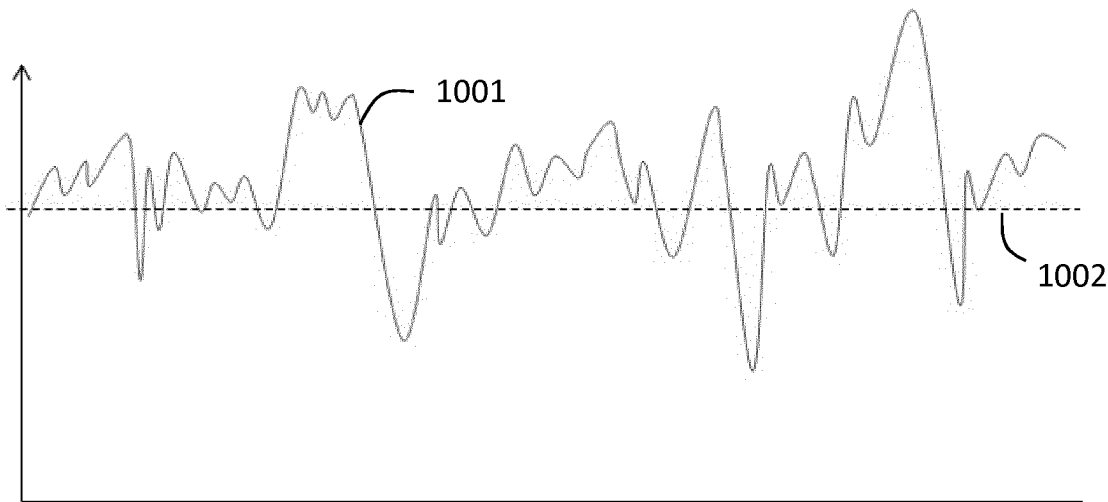
FIG. 10 illustrates by way of example instantaneous data rate available for a terminal over a period of a streaming session.

FIG. 10 illustrates by way of example how the assistance data may include a network estimated average value for a certain time period over available data rate, since instantaneous radio access conditions and cell load conditions are varying over time. In the drawing, the vertical axis indicates instantaneous data rate 1001 available to one terminal 100, taking network and radio link parameters into account, e.g. system capacity and radio link quality. The dashed line 1002 indicates average data rate over a certain period of time. This may be included in the network assistance data, and be used as an average data rate prediction for a certain time period going forward, to assist the terminal streaming client 101 in the selection of a suitable segment variant. If segments are selected corresponding to the average available data rate 1002 or lower, occasions with lower available data rate than the average value 1002 can still be handled by terminal streaming buffering, ensuring that enough data is always available to the client 101.

According to the embodiments outlined with reference to FIGS. 9 and 10, the network 1 may respond with assistance data, upon request, if the network 1 is capable of such functionality. However one cannot assume that all networks 1 support such streaming assistance. If no assistance data is received terminal algorithm may exclude the request signaling for a certain period or e.g. until current utilized RAT or cell identity has changed. The terminal client 101 will be running the codec selection algorithm of FIG. 9 and if it has received assistance data a further new aspect with this invention is the possibility for the terminal algorithm to combine information available in the terminal with the received assistance data. The utilization of the assistance data could e.g. include selecting suitable code rate, or adjusting buffering parameters. The codec rate selection could be implemented as weighting available terminal data together with assistance information. The buffering parameter adjustments could be done e.g. to decide to increase or decrease the amount of segments being buffered in each buffer refill period, or to adjust the remaining buffer level when additional segments are being requested from the streaming server.

So, the embodiments outlined with reference to FIGS. 9 and 10 include at least the following aspects:

A terminal streaming algorithm configured to include a decision function if data available in the terminal is enough and accurate enough to take decisions on buffering strategies, such as buffer levels and codec selection. If data available in the terminal is deemed not accurate enough, an assistance request can be sent to the network.

The terminal streaming algorithm may be configured to consider utilized RAT for selection of the type of assistance data requests.

The terminal streaming algorithm may be configured to consider whether assistance data becomes available after a request. If no assistance data has been received, the terminal algorithm may be configured to not send further assistance requests for a certain period, or until a trigger event has occurred.

The terminal streaming algorithm may utilize received assistance data to take into account for codec selection and buffering strategies.

Figure 11:
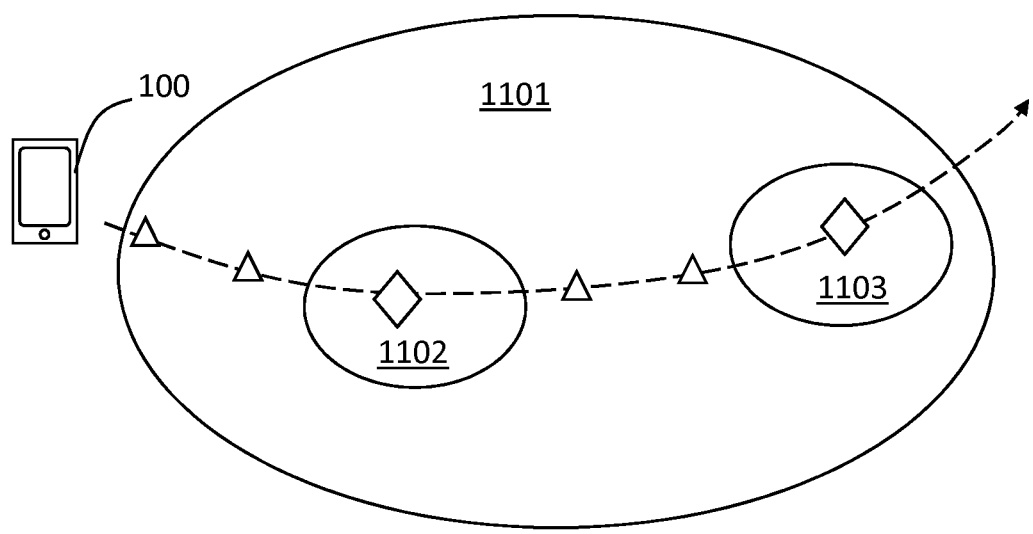
FIG. 11 illustrates a terminal moving between different cells during an ongoing streaming session, facing aspects of temporarily higher or lower data rate availability or cell capacity due to different cell load.

FIG. 11 illustrates by way of example an embodiment employed in a heterogeneous radio system. In such a radio system, the radio network 1 consists of multiple cells 1101, 1102, 1103 with different sizes, radio access technologies etc., and where typically more than one cell covers the same geographical area. The different cells might have different instantaneous traffic load, depending on the mobile nature of the connected terminals, as well as the dynamic traffic patterns of the terminals. In the embodiment of FIG. 11, the radio network may be described also with reference to FIG. 1, in that the network includes one or more network nodes, e.g. 11 or 15, which are aware of the fact that a terminal 100 is currently involved in a streaming session over the radio network, by receiving data from a streaming server 30. This network node 11 or 15, is here denoted a network assistance unit. A terminal 100 utilizing a radio access system with a cell scenario as in FIG. 11 would benefit from receiving network assistance for its streaming client 101, where the network assistance would not only consist of predicted/suggested future available data rates as outlined above, but also new types of assistance data. In one embodiment, the new type of assistance data transferred by the mobile network nodes 11, 15 to the terminal 100 would consist of buffer filling recommendations. These buffer filling recommendations could indicate size and/or timing of recommended buffer refilling, in order to handle high traffic load situations or other aspects related to issues e.g. due to terminal mobility.

Since multimedia streaming consumes a significant amount of all data traffic it is here proposed that besides above mentioned concepts the network 1 can send buffer refill instructions in terms of recommended refill size, in order e.g. for network to control cell load in a more dynamic fashion.

FIG. 11 shows a number of cells 1101, 1102, 1103 belonging to the same mobile network 1, where a network assistance unit 11, 15 is handling the terminal streaming network assistance transfers. The different cells 1101, 1102, 1103 have different capacity and instantaneous load, e.g. since they may be run in different frequency bands, they may serve different total amount of active terminals, or they may be shared with other mobile operators. A terminal 100 moving between these cells 1101, 1102, 1103 during an ongoing streaming session 13 will face aspects such as temporarily lower data rate availability during a time period when a high priority service is initiated, or different available cell capacity due to the different cell load. In this illustration we assume that the smaller cells 1102 and 1103 have higher capacity in relation to the number of connected terminals, than the macro cell 1101. Another scenario is where carriers are aggregated. Hence, when a terminal 100 is in an area covered by more than two cells the data rate improves as the carriers are aggregated. This can then be utilized to control the buffer algorithm.

With the introduction of network assisted buffer size refill recommendation a terminal moving in between the different cells 1101, 1102, 1103 could get its buffer refills coordinated to optimize the network cell load dynamically. In case the network 1 instructs the terminal 100 to fill its streaming buffer 103 with additional larger size of data during the time the terminal 100 is located in the higher available capacity cells 1102, 1103 the streaming traffic load in the lower available capacity cell 1101 is reduced.

Compared with existing solutions, e.g. with a paging based method, the addition of a size indication for the buffer refill instruction would incorporate a new information element consisting of an instruction in terms of a few information bits. The information bits could provide guidance of how many kB and/or how many seconds of media playback the network recommends to fill up the streaming buffer with. These additional bits could be sent in a separate network streaming assistance message from network, but could be included in other existing messages as well.

In the embodiments described above, a terminal 100 is connected to a streaming media content server 30 on Internet 20 via a radio access network 1, e.g. a cellular radio network 1. In the video streaming protocol there is an end-to-end connectivity protocol assumed between the terminal 100 and the content server 30, typically using an adaptive bit rate (ABR) protocol, e.g. MPEG DASH. Within such a protocol the UE is requested to dynamically select the video quality for each downloaded video segment, matching the varying data rate available in the end-to-end communication link. A significant part of these variations will come from dynamic aspects in the radio access network. Hence, in order to do as good estimation as possible of suitable bit rate variation over time, a network assistance protocol is defined. With this protocol the radio access network can share information about suitable media data rates to match current radio access network conditions in a better way than the UE can do itself. This has been outlined in general for the embodiments above, while it will be for the skilled person implementing the ideas presented herein to decide on the details of the network assistance protocol. However, besides the purpose of the network 1 providing immediate network status and data rate indications to a terminal streaming client 101, the protocol may include functionality. In one embodiment, a communication protocol between the terminal 100 and the radio access network 1 in a data streaming scenario 13 may include the following aspects:

The terminal 100 is capable of transferring video (or other data) streaming information for network statistics storage. The network 1 may store this video streaming statistics, and combine it with other media and RAT related data. This information can be used locally for specific parts of the radio access network, i.e. at a certain base station 12, or for a global network usage throughout the network 1.

The network 1 may be configured to use the data and statistics as part of improved terminal assistance to other terminals when applicable, e.g. using the network assistance protocol. One benefit from this could be that the streaming client 101 algorithm can instantly get assistance from network stored data and analytics and thereby quicker adjust to e.g. network/cell specific conditions, instead of a terminal-based slower adaptive learning algorithm.

Figure 12:
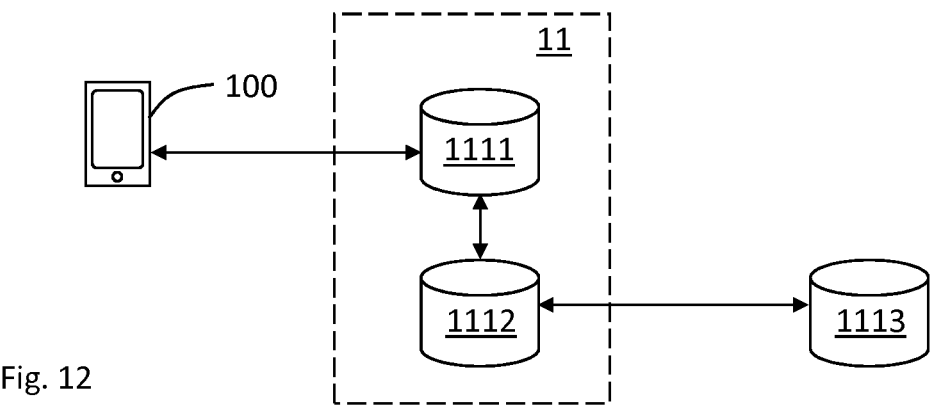
FIG. 12 illustrates a setup for using a media streaming related terminal to radio network communication protocol for statistics collection and distribution.

FIG. 12 illustrates this embodiment schematically. The addition of this embodiment is to add a data streaming analysis unit in the mobile network, e.g. a node 11 connected to a radio access network node 12, and to use a UE—network protocol for video streaming related statistics data storing and sharing. The purpose and system usage can work according to following principle:

A streaming client 101 typically includes an algorithm for buffer/re-buffer strategies. This algorithm defines a set of dynamic parameters, e.g. suitable amount of data to buffer each re-buffer occasion, and the suitable minimum/maximum levels of buffered data. These parameters can be adaptively defined within the algorithm by learning/adopting over time. However this can be a time-consuming process for finding suitable parameters per network condition.

With this proposed functionality a terminal 100, with its streaming client 101 can share information and selected parameters via the network assistance protocol. This can be stored and treated in the network 1.

When a terminal (the same terminal 100 or another one) accesses a network 1 or part of a network that includes network assistance, the stored information can be used by the network to assist the terminal to quicker (or immediately) select suitable streaming algorithm parameters. The principle of the communication between elements of the embodiment is illustrated in FIG. 12, which will be described for the exemplary use of video streaming.

Upon a video streaming session 13 start the terminal 100 initiates a network assistance protocol communication. The terminal 100 and network 1 will share video streaming session related information in accordance with legacy functionality for network assistance and any of the embodiments described above. However, in addition to this, a network assistance server(s) 11 includes a statistics storing unit 1112, configured to collect information and data about the video sessions 13. The information stored in the network assistance storing unit 1112 can be collected from session related information temporarily stored in a memory 1111 of the network assistance server 11, and in addition the terminal 100 can send specific information targeting storage in network assistance storing unit 1112.

Stored information in the network assistance storing unit 1112 can be analyzed and combined into both local and global video streaming related information. Local information and be related to a specific radio access network cell, i.e. the base station 12, or a group of terminal types. Global information can e.g. be statistics from all cells and terminals in a certain country, including data from nodes 1113 of other networks. The network 1 can take this stored statistics information into account in order to provide other systems and interfaces with local and global video streaming information, or provide further improved session related network assistance, in accordance with the original purpose of the network assistance protocol.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items, and the phrase "based on" is intended to be interpreted as "based, at least in part, on," unless explicitly stated otherwise. The term "and/or" is intended to be interpreted to include any and all combinations of one or more of the associated items.

The embodiments described herein may be implemented in many different forms of software, firmware, and/or hardware. For example, a process or a function may be implemented as "logic" or as a "component." This logic, such as controller 102, may include hardware (e.g. a processor) or a combination of hardware and software. The embodiments have been described without reference to the specific software code since software can be designed to implement the embodiments based on the description herein and the accompanying drawings. Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to the memory forming part of or being connected to controller 102. The terms "comprise," "comprises" or "comprising," as well as synonyms thereof, when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the appended claims. The specification and drawings are accordingly to be regarded as illustrative rather than restrictive.

The invention claimed is:

1. A method carried out in a radio terminal for receiving streaming media, which terminal includes a modem for connecting to a radio network including at least one of a radio access network or a core network, and a data streaming client including a streaming data buffer for receiving streaming data from a streaming data server on the Internet and accessible via the radio network and which is under control by a controller, the method comprising
   signaling the radio network, by means of the modem, to indicate streaming service initiation and the terminal data buffer size;
   receiving a buffer filling signal message comprising buffer control data from the radio network;
   buffering media data of a streaming media file received from the streaming data server through the radio network according to a buffer scheme adapted dependent on the data buffer size, wherein the buffer scheme is run by the controller of the streaming data client and also takes into account the received buffer control data; and
   signaling the radio network, by means of the modem, to indicate streaming service termination.

2. The method of claim 1, wherein the step of
   receiving a buffer filling signal message from the radio network, includes a recommendation of a suitable instance for buffer filling, and wherein the buffer scheme includes timing data for filling the buffer with received media data determined dependent on said suitable instance.

3. The method of claim 2, wherein the buffer filling signal message includes an indication of suitable amount of refill data to buffer at said suitable instance, and wherein the buffer scheme includes data burst size determined based on said suitable amount.

4. The method of claim 1, comprising the steps of
   transferring timing data for instances of filling the buffer from the streaming client to the modem;
   signaling the radio network, by means of the modem, to indicate the timing data.

5. The method of claim 1, wherein the buffer scheme includes receiving streaming data in data bursts corresponding to said data buffer size.

6. The method of claim 1, comprising the steps of
   receiving a modem control signal from the radio network, and
   applying power control of the modem between instances of buffering in accordance with the modem control signal.

7. The method of claim 1, comprising the steps of
   determining a recommended compression level corresponding to instantaneous modem power consumption; and
   signaling the radio network to transmit streaming media data encoded based on the recommended compression level.

8. A method carried out in a streaming scheduling device, connected to a base station of a radio network, including at least one of a radio access network or a core network, for communicating with radio terminals, for controlling transfer of streaming media data from a streaming server on the Internet through the radio network to a modem of a first terminal, comprising the steps of:
   detecting a signal message, indicating a streaming service initiation at the terminal involving transmitting streaming data through said base station for reception in the first terminal, said signal message including an indication of data buffer size in the terminal;
   assessing current radio network capacity;
   determining streaming buffer control data dependent on the radio network capacity and the received terminal data buffer size;
   transmitting a buffer filling signal message, comprising the determined streaming buffer control data to the first terminal, for use in the terminal to control buffering; and
   terminate determining streaming buffer control data responsive to receiving a signal indicating streaming service termination.

9. The method of claim 8, wherein the buffer filling signal message comprises suitable instance for buffer filling, for use in the terminal to control buffering.

10. The method of claim 8, wherein streaming buffer control data is determined dependent on one or more of:
    aggregated data traffic load, including data traffic to instantaneous traffic load to all served data terminals;
    incoming and outgoing data traffic timing for the first terminal;
    mobility signaling for the first terminal;
    instantaneous radio channel properties in the connection with the first terminal; and
    availability of cashed multimedia data within the radio network.

11. The method of claim 8, comprising the steps of
    determining radio link information related to the connection between the radio network and the first terminal; and
    transmitting a codec selection instruction to a streaming data delivery unit, capable of delivering streaming data at a first higher compression level and at a second lower compression level, to select the second compression level dependent on the determined link information indicating that network capacity has increased over, or exceeds, a comparable capacity level.

12. The method of claim 8, wherein the control unit is communicatively connected to a local buffer connected to the base station, having a buffer size corresponding to said suitable amount, and configured to fill the local buffer with data blocks from the streaming server between said suitable instances.

13. A radio terminal for playing streaming media, comprising:
a modem configured to receive media data from a streaming data server on the Internet via a base station of a radio network including at least one of a radio access network or a core network;
a streaming buffer connected to the modem;
a media player connected to receive media data from the streaming buffer for playing streaming media; and
a controller configured to generate a signal message to the radio network to indicate streaming service initiation and the terminal data buffer size, and to receive a buffer filling signal message comprising buffer control data from the radio network, wherein the controller is configured to control filling of the buffer based on the received buffer filling signal message, wherein the controller is further configured to signal the radio network, by means of the modem, to indicate streaming service termination.

14. The radio terminal of claim 13, wherein the controller is configured to initiate buffer filling at a point in time determined based on a recommendation of a suitable instance for buffer filling.

* * * * *